United States Patent
Sorimachi (10) Patent No.: US 11,305,228 B2
(45) Date of Patent: *Apr. 19, 2022

(54) METHOD FOR FIXING CARBON DIOXIDE, METHOD FOR PRODUCING FIXED CARBON DIOXIDE, AND FIXED CARBON DIOXIDE PRODUCTION APPARATUS

(71) Applicants: Kenji Sorimachi, Takasaki (JP); SHINKO SANGYO Co., Ltd., Takasaki (JP)

(72) Inventor: Kenji Sorimachi, Gunma (JP)

(73) Assignees: Kenji Sorimachi, Gunma (JP); SHINKO SANGYO Co., Ltd., Gunma (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/051,350

(22) PCT Filed: Aug. 29, 2019

(86) PCT No.: PCT/JP2019/034000
§ 371 (c)(1),
(2) Date: Oct. 28, 2020

(87) PCT Pub. No.: WO2021/038808
PCT Pub. Date: Mar. 4, 2021

(65) Prior Publication Data
US 2021/0260524 A1     Aug. 26, 2021

(51) Int. Cl.
*C01F 11/18* (2006.01)
*B01D 53/78* (2006.01)
*B01D 53/62* (2006.01)

(52) U.S. Cl.
CPC .............. *B01D 53/62* (2013.01); *B01D 53/78* (2013.01); *C01F 11/181* (2013.01);
(Continued)

(58) Field of Classification Search
CPC .. B01D 53/62; B01D 53/78; B01D 2251/304; B01D 2251/604; B01D 2257/504; B01D 2258/0283; Y02C 20/40; Y02E 20/32
See application file for complete search history.

(56) References Cited

U.S. PATENT DOCUMENTS

| 3,973,949 A | 8/1976 | Goens et al. |
| 4,069,117 A * | 1/1978 | Cooper ............... B01D 53/501 423/220 |

(Continued)

FOREIGN PATENT DOCUMENTS

| AU | 2007101174 | 1/2008 |
| CN | 201279437 Y | 7/2009 |

(Continued)

OTHER PUBLICATIONS

Office Action issued in the related Japanese patent application (No. 2020-165194) dated Jan. 26, 2021, 2 pages.
(Continued)

*Primary Examiner* — Timothy C Vanoy
(74) *Attorney, Agent, or Firm* — Hamre, Schumann, Mueller & Larson, P.C.

(57) ABSTRACT

The present invention provides a new method for fixing carbon dioxide. The method for fixing carbon dioxide of the present invention includes a contact step of bringing a mixed liquid containing sodium hydroxide and further containing at least one of a chloride of a Group 2 element or a chloride of a divalent metal element into contact with a gas containing carbon dioxide.

20 Claims, 8 Drawing Sheets

(52) U.S. Cl.
CPC .. *B01D 2251/304* (2013.01); *B01D 2251/404* (2013.01); *B01D 2251/50* (2013.01); *B01D 2251/604* (2013.01); *B01D 2258/0283* (2013.01)

(56) References Cited

U.S. PATENT DOCUMENTS

| | | | |
|---|---|---|---|
| 4,600,567 | A | 7/1986 | Reeder |
| 5,958,353 | A | 9/1999 | Eyal |
| 9,346,684 | B2 | 5/2016 | Berkowitz et al. |
| 2006/0185985 | A1 | 8/2006 | Jones |
| 2008/0245660 | A1 | 10/2008 | Little et al. |
| 2010/0150803 | A1* | 6/2010 | Lin .............. B01D 53/62 423/224 |
| 2010/0230293 | A1 | 9/2010 | Gilliam et al. |
| 2010/0258506 | A1 | 10/2010 | Berkowitz et al. |
| 2012/0114548 | A1 | 5/2012 | Bang et al. |
| 2012/0219484 | A1 | 8/2012 | Clark |
| 2012/0269714 | A1 | 10/2012 | Jang et al. |
| 2013/0161200 | A1 | 6/2013 | Iwamoto et al. |
| 2013/0180400 | A1 | 7/2013 | Iwamoto et al. |
| 2014/0093441 | A1 | 4/2014 | Jones et al. |
| 2014/0151240 | A1 | 6/2014 | Bedell et al. |
| 2014/0271440 | A1 | 9/2014 | Constantz et al. |
| 2015/0183653 | A1 | 7/2015 | Jung et al. |
| 2019/0022575 | A1 | 1/2019 | Tanaka et al. |
| 2019/0160395 | A1* | 5/2019 | Saini .............. B01D 53/62 |
| 2019/0232216 | A1 | 8/2019 | Imbabi et al. |
| 2020/0131045 | A1 | 4/2020 | Horiishi et al. |
| 2021/0001270 | A1* | 1/2021 | Lu .............. B01D 53/62 |
| 2021/0069642 | A1* | 3/2021 | Kalamaras ........... C02F 9/00 |

FOREIGN PATENT DOCUMENTS

| | | |
|---|---|---|
| CN | 101591033 | 12/2009 |
| CN | 104261449 | 1/2015 |
| CN | 107792875 | 3/2018 |
| CN | 111214938 | 6/2020 |
| EP | 2 631 005 | 8/2013 |
| GB | 2 547 696 A * | 8/2017 ........... B01D 53/268 |
| JP | 50-155469 | 12/1975 |
| JP | 54-127899 | 10/1979 |
| JP | 61-048428 | 3/1986 |
| JP | 61-164625 | 7/1986 |
| JP | 6-263433 | 6/1994 |
| JP | 7-013421 U | 3/1995 |
| JP | 8-503884 | 4/1996 |
| JP | 11-192416 | 7/1999 |
| JP | 2001-129356 | 5/2001 |
| JP | 2002-320821 | 11/2002 |
| JP | 2004-059372 | 2/2004 |
| JP | 2006-137620 | 6/2006 |
| JP | 2006-150232 | 6/2006 |
| JP | 2006-167616 | 6/2006 |
| JP | 2006-231199 | 9/2006 |
| JP | 2008-045049 | 2/2008 |
| JP | 2008-514406 | 5/2008 |
| JP | 2009-173487 | 8/2009 |
| JP | 2010-502420 | 1/2010 |
| JP | 2010-070438 | 4/2010 |
| JP | 2010-125354 | 6/2010 |
| JP | 2011-020058 | 2/2011 |
| JP | 2011-025117 | 2/2011 |
| JP | 2011-079416 | 4/2011 |
| JP | 2011-120974 | 6/2011 |
| JP | 2011-528407 | 11/2011 |
| JP | 2012-050905 | 3/2012 |
| JP | 2012-057230 | 3/2012 |
| JP | 2012-206872 | 10/2012 |
| JP | 2013-044032 | 3/2013 |
| JP | 2015-208735 | 11/2015 |
| JP | 2019-048270 | 3/2019 |
| JP | 2019-527178 | 9/2019 |
| JP | 2019-196286 | 11/2019 |
| JP | 2019-200839 | 11/2019 |
| KR | 10-2009-0006934 | 1/2009 |
| KR | 10-2014-0032822 | 3/2014 |
| KR | 10-2016-0119429 | 10/2016 |
| KR | 10-2018-0047658 | 5/2018 |
| KR | 10-2020-0062955 | 6/2020 |
| WO | 2012/050530 | 4/2012 |
| WO | WO 2015 194 963 A1 * | 12/2015 ............... C01D 7/07 |
| WO | 2017/122478 | 7/2017 |
| WO | 2019/225202 | 11/2019 |

OTHER PUBLICATIONS

Office Action issued in the related Japanese patent application (No. 2020-539303) dated Feb. 2, 2021, 12 pages.
English Translation of International Search Report for PCT/JP2019/034000 dated Nov. 26, 2019, 2 pages.
English Translation of Office Action issued in the related Japanese Patent Application No. 2020-165194 dated Jan. 26, 2021, 2 pages.
Extended European Search Report for European patent application (No. 19923726.4) dated Jun. 29, 2021, 7 pages.
Extended European Search Report for European patent application (No. 20746835.6) dated Aug. 4, 2021, 8 pages.
English Translation of International Search Report for PCT/JP2019/048178 dated Feb. 18, 2020, 3 pages.
English Translation of International Search Report for PCT/JP2020/002064 dated Mar. 24, 2020, 3 pages.
English Translation of International Search Report for PCT/JP2020/026990 dated Sep. 29, 2020, 3 pages.
English Translation of International Search Report for PCT/JP2020/029505 dated Oct. 20, 2020, 3 pages.
English Translation of International Search Report for PCT/JP2020/029504 dated Oct. 27, 2020, 4 pages.
English Translation of Office Action issued in Japanese patent application (No. 2020-542346) dated Oct. 20, 2020, 9 pages.
Extended European Search Report for the related European patent application No. 19923725.6 dated Apr. 7, 2021, 9 pages.
Extended European Search Report for the related European patent application No. 19923727.2 dated Mar. 31, 2021, 8 pages.
Jeon et al., "CO2 storage and CaCO3 production using seawater and an alkali industrial by-product", Chemical Engeneering Journal, vol. 378, 2019, 122180, 9 pages.
English Translation of Office Action issued in the related Japanese patent application No. 2020-124289 dated Nov. 10, 2020, 12 pages.
English Translation of International Search Report for PCT/JP2019/045389 dated Feb. 10, 2020, 3 pages.
English Translation of International Search Report for PCT/JP2019/045390 dated Feb. 10, 2020, 3 pages.
English Translation of International Search Report for PCT/JP2020/026989 dated Sep. 15, 2020, 3 pages.
U.S. Appl. No. 16/969,467, filed Aug. 12, 2020.
U.S. Appl. No. 16/981,173, filed Sep. 15, 2020.
U.S. Appl. No. 17/051,671, filed Oct. 29, 2020.
U.S. Appl. No. 17/051,676, filed Oct. 29, 2020.
International Search Report for PCT/JP2020/002064 dated Mar. 24, 2020, 4 pages.
International Search Report for PCT/JP2019/034000 dated Nov. 26, 2019, 3 pages.
International Search Report for PCT/JP2019/045389 dated Feb. 10, 2020, 3 pages.
International Search Report for PCT/JP2019/045390 dated Feb. 10, 2020, 4 pages.
International Search Report for PCT/JP2020/026989 dated Sep. 15, 2020, 4 pages.
International Search Report for PCT/JP2019/048178 dated Feb. 18, 2020, 3 pages.
International Search Report for PCT/JP2020/026990 dated Sep. 29, 2020, 4 pages.
International Search Report for PCT/JP2020/029505 dated Oct. 20, 2020, 4 pages.
International Search Report for PCT/JP2020/029504 dated Oct. 27, 2020, 5 pages.

(56) References Cited

OTHER PUBLICATIONS

O. Nishida et.al, "Development of After Treatment System on COx with Seawater Electrolysis for Marine Diesel Engine", Journal of the JIME, vol. 38, No. 2, pp. 31-36.
Office Action issued in the related Japanese patent application (No. 2020-542346) dated Oct. 20, 2020, 10 pages.
Office Action issued in the related Japanese Patent Application No. 2020-124289 dated Nov. 10, 2020, 14 pages.
Xie, H. et al., "Using electrochemical process to mineralize CO2 and separate $Ca^{2+}/Mg^{2+}$ ions from hard water to produce high value-added carbonates", Environmental Earth Sciences, vol. 73, pp. 6881-6890.
Sasaki et al., "Analytical study on pH transition due to carbonation of concrete based on alkali ion concentration", Proceedings of the Japan Concrete Institute, vol. 25, No. 1, pp. 689-694, URL: http://data.jcinet.or.jp/data_html/25/025-01-1109.html.
Extended European Search Report for the related European patent application No. 19916546.5 dated Oct. 12, 2021, 7 pages.

\* cited by examiner

METHOD FOR FIXING CARBON DIOXIDE, METHOD FOR PRODUCING FIXED CARBON DIOXIDE, AND FIXED CARBON DIOXIDE PRODUCTION APPARATUS

TECHNICAL FIELD

The present invention relates to a method for fixing carbon dioxide, a method for producing fixed carbon dioxide, and a fixed carbon dioxide production apparatus.

BACKGROUND ART

As a method for fixing carbon dioxide, for example, Patent Literature 1 describes a method for producing sodium carbonate by reacting an aqueous sodium hydroxide solution with a combustion exhaust gas containing carbon dioxide. However, new methods for fixing carbon dioxide are required.

CITATION LIST

Patent Literature

Patent Literature 1: JPH6 (1994)-263433 A

SUMMARY OF INVENTION

Technical Problem

With the foregoing in mind, it is an object of the present invention to provide a new method for fixing carbon dioxide, method for producing fixed carbon dioxide, and fixed carbon dioxide production apparatus.

Solution to Problem

In order to achieve the above object, the present invention provides a method for fixing carbon dioxide, including a contact step of bringing a mixed liquid containing sodium hydroxide and further containing at least one of a chloride of a Group 2 element or a chloride of a divalent metal element into contact with a gas containing carbon dioxide.

The present invention also provides a method for producing fixed carbon dioxide, including: a fixation step of fixing carbon dioxide, wherein the fixation step is carried out by the method for fixing carbon dioxide according to the present invention.

The present invention also provides a fixed carbon dioxide production apparatus, including a contact unit that brings a mixed liquid containing sodium hydroxide and further containing at least one of a chloride of a Group 2 element or a chloride of a divalent metal element into contact with a gas containing carbon dioxide.

Advantageous Effects of Invention

The present invention can provide a new method for fixing carbon dioxide.

DESCRIPTION OF EMBODIMENTS

The method for fixing carbon dioxide of the present invention includes a contact step of bringing a mixed liquid containing sodium hydroxide and calcium chloride into contact with a gas containing carbon dioxide, for example.

In the method for fixing carbon dioxide of the present invention, for example, a concentration of the sodium hydroxide in the mixed liquid is less than 0.2 N.

In the method for fixing carbon dioxide of the present invention, for example, the concentration of the sodium hydroxide in the mixed liquid is 0.05 N or more.

In the method for fixing carbon dioxide of the present invention, for example, a concentration of the calcium chloride in the mixed liquid is 0.05 mol/l or more.

In the contact step in the method for fixing carbon dioxide of the present invention, for example, the mixed liquid and the gas are brought into contact with each other by bubbling the gas into the mixed liquid.

In the contact step in the method for fixing carbon dioxide of the present invention, for example, the mixed liquid and the gas are brought into contact with each other in a state where the mixed liquid is shaken.

In the contact step in the method for fixing carbon dioxide of the present invention, for example, the mixed liquid and the gas are brought into contact with each other in a state where the mixed liquid is in a state of mist.

In the method for fixing carbon dioxide of the present invention, for example, the contact step includes: a first contact step of bringing a mixed liquid containing sodium hydroxide into contact with a gas containing carbon dioxide; and a second contact step of adding calcium chloride to the mixed liquid and further bringing the mixed liquid into contact with a gas containing carbon dioxide.

The fixed carbon dioxide production apparatus of the present invention includes a contact unit that brings a mixed liquid containing sodium hydroxide and calcium chloride into contact with a gas containing carbon dioxide.

In the fixed carbon dioxide production apparatus of the present invention, for example, the contact unit is a unit that brings the mixed liquid and the gas into contact with each other by bubbling the gas into the mixed liquid.

In the fixed carbon dioxide production apparatus of the present invention, for example, the contact unit is a unit that brings the mixed liquid and the gas into contact with each other in a state where a flow is generated in the mixed liquid.

In the fixed carbon dioxide production apparatus of the present invention, for example, the contact unit is a unit that brings the mixed liquid and the gas into contact with each other in a state where the mixed liquid is shaken.

In the fixed carbon dioxide production apparatus of the present invention, for example, the contact unit includes a vessel in which the mixed liquid and the gas containing carbon dioxide are brought into contact with each other.

In the fixed carbon dioxide production apparatus of the present invention, for example, the vessel includes a plurality of secondary vessels, and the mixed liquid is allowed to come into contact with the gas by sequentially flowing through the plurality of secondary vessels.

In the fixed carbon dioxide production apparatus of the present invention, for example, the vessel has a polygonal cross-section at a bottom surface.

In the fixed carbon dioxide production apparatus of the present invention, for example, the vessel has a non-regular polygonal cross-section at a bottom surface.

In the fixed carbon dioxide production apparatus of the present invention, for example, the vessel has a network structure, and the mixed liquid is allowed to come into contact with the gas by flowing through the network structure.

In the fixed carbon dioxide production apparatus of the present invention, for example, the contact unit is a unit that brings the mixed liquid and the gas into contact with each other in a state where the mixed liquid is in a state of mist.

Terms used in the present specification each have a meaning commonly used in the art, unless otherwise stated.

Embodiments of the present invention will be described below with reference to drawings.

(Method for Fixing Carbon Dioxide)

The method for fixing carbon dioxide of the present invention includes a contact step of bringing a mixed liquid containing sodium hydroxide (NaOH) and further containing at least one of a chloride of a Group 2 element (alkaline earth metal) or a chloride of a divalent metal element into contact with a gas containing carbon dioxide ($CO_2$). In the method for fixing carbon dioxide of the present invention, other configurations and conditions are not particularly limited.

The Group 2 element is not particularly limited, and examples thereof include beryllium, magnesium, calcium, strontium, barium, and radium. Among them, the Group 2 element may be calcium, magnesium, strontium, or barium. Examples of the chloride of a Group 2 element include calcium chloride, magnesium chloride, strontium chloride, and barium chloride.

The divalent metal element is not particularly limited, and may be, for example, zinc. The chloride of a divalent metal element may be, for example, zinc chloride.

The present invention will be described below with reference to an example in which the mixed liquid contains calcium chloride as the chloride of a Group 2 element (alkaline earth metal). The present invention, however, is not limited thereto.

The method for fixing carbon dioxide of the present invention includes a contact step of bringing a mixed liquid containing sodium hydroxide (NaOH) and calcium chloride ($CaCl_2$)) into contact with a gas containing carbon dioxide ($CO_2$), as described above. In the method for fixing carbon dioxide of the present invention, other configurations and conditions are not particularly limited.

According to the method for fixing carbon dioxide of the present invention, by including the contact step, carbon dioxide can be fixed by reacting sodium hydroxide and calcium chloride with carbon dioxide to produce calcium carbonate ($CaCO_3$).

In the present invention, "fixation of carbon dioxide (also referred to as fixation)" means, for example, reducing the carbon dioxide concentration in a gas containing carbon dioxide by removing carbon dioxide from the gas.

The gas containing carbon dioxide is not particularly limited, and examples thereof include flue gas, indoor air, and air.

The carbon dioxide concentration in the gas containing carbon dioxide is not particularly limited, and is, for example, 0 to 100%. As will be described below, according to the present invention, even carbon dioxide at a low concentration can be fixed. Further, since a white precipitate is formed in the mixed liquid by bubbling 100% carbon dioxide, the present invention brings about an effect even in carbon dioxide fixation at a high concentration.

The temperature of the gas containing carbon dioxide is not particularly limited, and may be, for example, a low temperature of 0° C. or less, a common temperature of atmospheric temperature or room temperature, a temperature of less than 100° C., or a high temperature of 120° C. to 200° C. It is to be noted that the temperature of the gas is preferably a low temperature from the viewpoint of preventing evaporation of water. However, according to the present invention, as will be described below, even when high concentration sodium hydroxide is produced, for example, due to high heat, the concentration can be decreased. Thus, the present invention can be applied even if the gas containing carbon dioxide is high in heat, for example.

The gas containing carbon dioxide may contain, for example, a substance other than carbon dioxide. The substance other than carbon dioxide is not particularly limited, and examples thereof include $SO_x$, $NO_x$, $O_2$, and dust. In addition, in the present invention, since the mixed liquid is basically alkaline, for example, it is presumed that a neutralization reaction occurs between the mixed liquid and the acidic substance and the like. The present invention, however, is not limited thereto.

The mixed liquid contains sodium hydroxide and calcium chloride as described above. The method for producing the mixed liquid is not particularly limited, and may be, for example, low concentration mixing. The low concentration may be less than 5 N as the concentration of sodium hydroxide before the mixing, for example. By the low concentration mixing, for example, the precipitate of calcium hydroxide can be prevented from forming. Specifically, the mixed liquid can be produced, for example, by feeding a 0.1 N sodium hydroxide solution and a 0.1 mol/l calcium chloride solution into a vessel, and then mixing them.

In the mixed liquid, the concentration of the sodium hydroxide is not particularly limited, and is, for example, 0.01 N or more or 0.05 N or more and 0.2 N or less, less than 0.2 N, or 0.1 N or less. It is to be noted that the unit "N" of the concentration indicates a normality, and 0.01 N is 0.01 mol/l in the case of sodium hydroxide. When the concentration of the sodium hydroxide is 0.01 N or more or 0.05 N or more, for example, more carbon dioxide can be fixed.

Further, when the concentration of the sodium hydroxide is less than 0.2 N or 0.1N or less, for example, more carbon dioxide can be fixed.

It is to be noted that, as will be mentioned in the examples described below, it is presumed that, when the concentration of the sodium hydroxide is 0.2 N or more, a precipitate of calcium hydroxide ($Ca(OH)_2$) is produced due to the reaction between calcium chloride and high concentration sodium hydroxide in the contact, thereby decreasing the synthesis amount of calcium carbonate due to the contact.

In other words, this means that, according to the method for fixing carbon dioxide of the present invention, even when high concentration sodium hydroxide is contained in the mixed liquid, a precipitate of calcium hydroxide is produced due to the reaction between calcium chloride and the high concentration sodium hydroxide, so that it is possible to reduce the concentration of sodium hydroxide in the mixed liquid. Therefore, according to the method for fixing carbon dioxide of the present invention, even when high concentration sodium hydroxide is produced due to high heat, for example, the concentration thereof can be decreased and the generation of harmful gas can be suppressed.

In the mixed liquid, the concentration of the calcium chloride is not particularly limited, and is, for example, 0.005 mol/l or more or 0.05 mol/l or more and 0.5 mol/l or less, less than 0.5 mol/1, or 0.1 mol/l or less. When the concentration of the calcium chloride is within the above range, for example, more carbon dioxide can be fixed.

The temperature of the mixed liquid is not particularly limited, and is, for example, 30° C. to 100° C. In addition, according to the present invention, as described above, even when high concentration sodium hydroxide is produced due to high heat, for example, the concentration can be decreased. Thus, the present invention can be applied, for example, even if the mixed liquid is high in heat.

The pH of the mixed liquid is not particularly limited, and for example, the pH of the mixed liquid containing 0.05 N sodium hydroxide and 0.05 mol/l calcium chloride is about 12.

In the contact step, the method of bringing the mixed liquid and the gas containing carbon dioxide into contact with each other is not particularly limited, and examples thereof include a method of bringing the mixed liquid and the gas into contact with each other by bubbling the gas into the mixed liquid, a method of bringing the mixed liquid and the gas into contact with each other in a state where the mixed liquid is allowed to stand or a flow is generated in the mixed liquid, and a method of bringing the mixed liquid and the gas into contact with each other in a state where the mixed liquid is in a state of mist. Further, the mixed liquid and the gas may be brought into contact with each other in a state where the gas is circulated.

When the mixed liquid and the gas are brought into contact with each other by bubbling the gas into the mixed liquid in the contact step, the bubbling condition is not particularly limited, and for example, 3 ml of 0.1 N sodium hydroxide solution and 3 ml of 0.1 mol/l calcium chloride solution can be added to a 10 ml-test tube and mixed, and then bubbling can be performed in the mixed liquid using carbon dioxide (manufactured by KOIKE SANSO KOGYO CO., LTD.) for 10 seconds (about 20 $cm^3$). It is to be noted that, the bubbling can be performed by ejecting carbon dioxide from the tip of the Pasteur pipette, for example. The time for performing the bubbling may be appropriately set, for example, in a range in which the precipitate formed does not disappear by further reaction.

In the contact step, when the mixed liquid and the gas are brought into contact with each other in a state where the mixed liquid is allowed to stand, the contact condition is not particularly limited. For example, the inside of a 2 l-PET bottle (commercially available one) having a common shape is brought into equilibrium with air, and then 10 ml of the mixed liquid is added to the PET bottle, thereby allowing the PET bottle to stand with its bottom facing down. The contact time may be, for example, 15 minutes, 30 minutes, 60 minutes, or overnight after the contact.

In the contact step, regarding "bringing the mixed liquid and the gas into contact with each other in a state where a flow is generated in the mixed liquid", for example, the mixed liquid and the gas may be brought into contact with each other in a state where the mixed liquid is shaken, the mixed liquid and the gas may be brought into contact with each other by flowing the mixed liquid through a vessel.

In the contact step, when the mixed liquid and the gas are brought into contact with each other in a state where the mixed liquid is shaken, the shaking condition is not particularly limited. For example, an octagonal prismatic plastic bottle (commercially available one) containing 10 ml of the mixed liquid can be shaken using a shaker (BR-21UM, manufactured by TAITEK) at 120 rpm. Furthermore, for example, a 2 l-vessel containing 50 ml of the mixed liquid can be vigorously shaken by an adult male hand 1 to 4 times with a shaking of 30 seconds as a single shake. The 1 to 4 shakes may be performed, for example, immediately after, 30 seconds after, 2 minutes after, 5 minutes after, or 4 hours after the contact.

In the contact step, when the mixed liquid and the gas are brought into contact with each other in a state where the mixed liquid is in a state of mist, the contact condition is not particularly limited. For example, about 4 ml of the mixed liquid can be sprayed into a 2 l-vessel containing the gas 10 times at 5 second intervals using a sprayer (commercially available one).

In the contact step, a contact unit that brings a mixed liquid containing sodium hydroxide and calcium chloride into contact with a gas containing carbon dioxide is not particularly limited, and reference can be made to the description as to the fixed carbon dioxide production apparatus to be described below.

The contact step may include: a first contact step of bringing a mixed liquid containing sodium hydroxide into contact with a gas containing carbon dioxide; and a second contact step of adding calcium chloride to the mixed liquid and further bringing the mixed liquid into contact with a gas containing carbon dioxide, for example.

The first contact step brings a mixed liquid containing sodium hydroxide into contact with a gas containing carbon dioxide. By the reaction between the sodium hydroxide and carbon dioxide by the first contact step, sodium hydrogen carbonate ($NaHCO_3$) or sodium carbonate ($Na_2CO_3$) is produced, and thus first carbon dioxide fixation can be performed.

In the first contact step, calcium chloride is not yet added. Therefore, even when high concentration sodium hydroxide is used in the first contact step, for example, calcium hydroxide due to reaction with calcium chloride is not produced. In addition, according to the first contact step, for example, the concentration of sodium hydroxide can be set to 0.1 N or less. Thus, in the subsequent second contact step, calcium hydroxide can be prevented from being produced due to the reaction between calcium chloride and a high concentration sodium hydroxide, and more carbon dioxide can be fixed.

The second contact step adds calcium chloride to the mixed liquid, and further brings the mixed liquid into contact with a gas containing carbon dioxide. By reacting sodium hydroxide and calcium chloride with carbon dioxide by the second contact step, calcium carbonate can be produced and carbon dioxide can be fixed.

Regarding the first and second contact steps, for example, reference can be made to the description as to the contact step described above.

(Method for Producing Fixed Carbon Dioxide)

The method for producing fixed carbon dioxide of the present invention includes a fixation step of fixing carbon dioxide, wherein the fixation step is carried out by the method for fixing carbon dioxide of the present invention as described above. The method for producing fixed carbon dioxide of the present invention is characterized in that it includes the fixation step, and other steps and conditions are not particularly limited. The method for fixing carbon dioxide of the present invention is as described above. The conditions and the like of the fixation step are not particularly limited, and are the same as those described in the method for fixing carbon dioxide of the present invention, for example.

(Fixed Carbon Dioxide Production Apparatus)

The fixed carbon dioxide production apparatus of the present invention includes a contact unit that brings a mixed liquid containing sodium hydroxide and calcium chloride into contact with a gas containing carbon dioxide as described above. The mixed liquid and the gas containing carbon dioxide are, for example, the same as described in the method for fixing carbon dioxide of the present invention.

Figure 12:
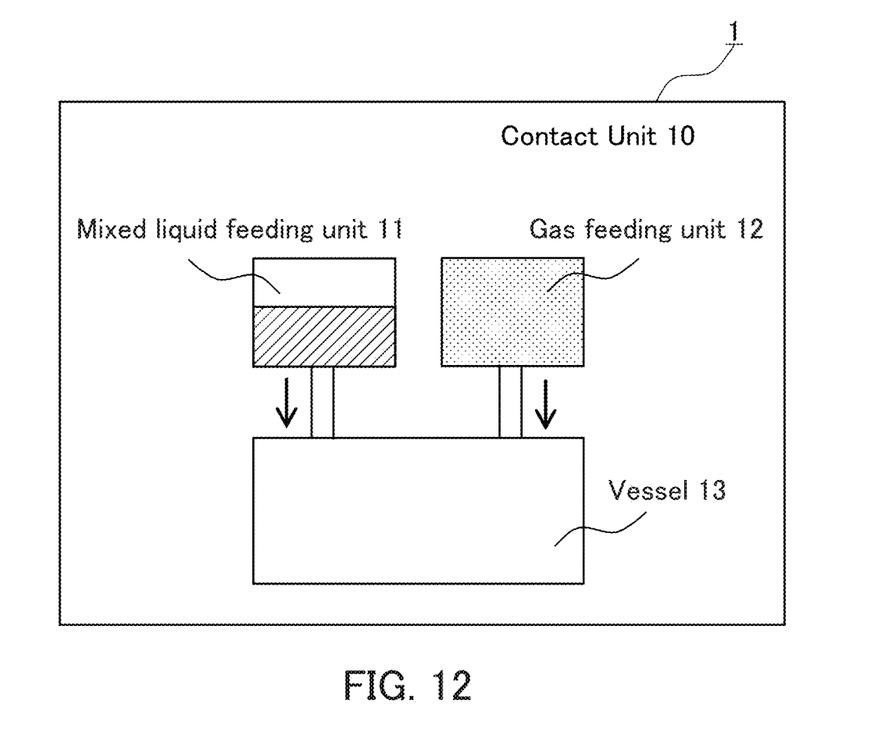
FIG. 12 is a schematic diagram showing an example of a contact unit.

The contact unit is not particularly limited as long as it can bring a mixed liquid containing sodium hydroxide and calcium chloride into contact with a gas containing carbon dioxide. FIG. 12 is a schematic diagram showing an example of the contact unit. As shown in FIG. 12, a fixed carbon dioxide production apparatus 1 includes a contact unit 10, and the contact unit 10 includes a mixed liquid feeding unit 11 that feeds the mixed liquid, a gas feeding unit 12 that feeds the gas containing carbon dioxide, and a vessel 13 in which the mixed liquid and the gas containing carbon dioxide are brought into contact with each other, for example.

The contact unit 10 may be, for example, a unit that brings the mixed liquid and the gas into contact with each other by bubbling the gas into the mixed liquid. The bubbling is, for example, as described above.

The contact unit 10 may be, for example, a unit that brings the mixed liquid and the gas into contact with each other in a state where the mixed liquid is allowed to stand or a flow is generated in the mixed liquid. Regarding "bringing the mixed liquid and the gas into contact with each other in a state where a flow is generated in the mixed liquid", for example, the mixed liquid and the gas may be brought into contact with each other in a state where the mixed liquid is shaken as described above, or the mixed liquid and the gas may be brought into contact with each other by flowing the mixed liquid through a vessel. When flowing the mixed liquid, the mixed liquid may be flowed in one direction or may be circulated.

The contact unit 10 may be, for example, a unit that brings the mixed liquid and the gas into contact with each other in a state where the mixed liquid is in a state of mist.

The contact unit 10 may be, for example, a unit that brings the mixed liquid and the gas into contact with each other in a state where the gas is circulated.

The contact unit 10 may be, for example, a closed system or an open system that allows the gas or the like to move to the outside.

The mixed liquid feeding unit 11 is not particularly limited as long as it can feed the mixed liquid, and may be, for example, a sprayer. The gas feeding unit 12 is not particularly limited as long as it can feed the gas containing carbon dioxide, and may be, for example, a Pasteur pipette.

The vessel 13 is not particularly limited as long as the mixed liquid and a gas containing carbon dioxide can be brought into contact with each other therein. The size of the vessel 13 can be appropriately set, for example, according to the amount of the gas containing carbon dioxide. Examples of the material of the vessel 13 include plastic, glass, and ceramic.

Figure 5A:
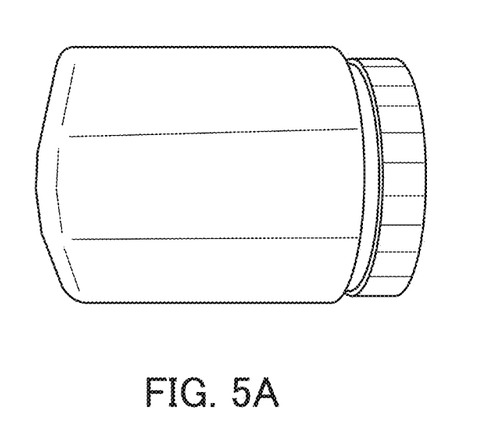
FIGS. 5A and 5B are diagrams showing the shape of an octagonal prism plastic bottle in Example 2.
Figure 5B:
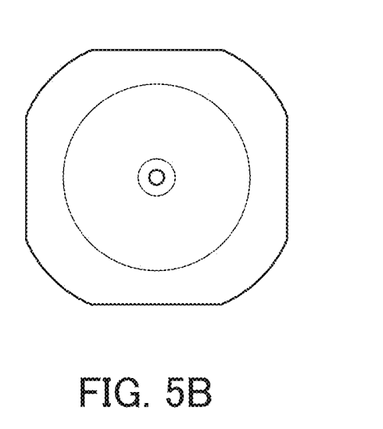

The shape of the vessel 13 can be appropriately set, for example, according to the mode of contact between the mixed liquid and the gas containing carbon dioxide. Specifically, for example, as described above, when the mixed liquid and the gas are brought into contact with each other in a state where the mixed liquid is shaken, it is preferable that the vessel 13 have a polygonal cross-section at a bottom surface. The polygonal shape is, for example, a non-regular polygonal shape. The polygonal shape is, for example, an octagonal shape. Specific examples of the shape of the vessel 13 include a polygonal prism shape and an octagonal prism shape as shown in FIG. 5. Since the vessel 13 has a polygonal cross-section at a bottom surface, more carbon dioxide can be fixed as described below. This is considered to be because, for example, in the shaking, the surface area of the mixed liquid increases, so that the mixed liquid can be brought into contact with more gas containing carbon dioxide. The present invention, however, is not limited thereto.

Figure 13A:
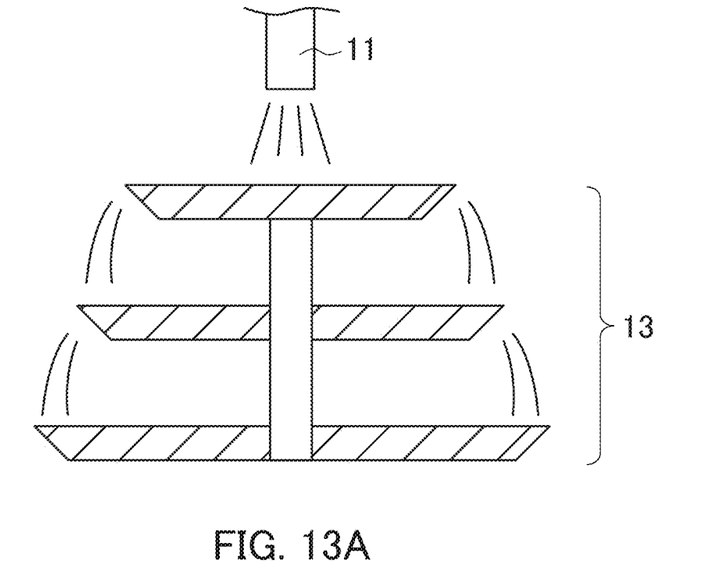
FIGS. 13A and 13B are diagrams each showing an example of a vessel.

Further, for example, as described above, when the mixed liquid and the gas are brought into contact with each other in a state where the mixed liquid is allowed to stand or a flow is generated in the mixed liquid in the vessel 13, the vessel 13 may include a plurality of secondary vessels. Then, for example, the mixed liquid may be allowed to come into contact with the gas by sequentially flowing through the plurality of secondary vessels. For example, as shown in FIG. 13A, the secondary vessel may have a basin-like structure with a shallow water depth. The plurality of secondary vessels may have, for example, a structure in which they are overlapped with each other with a space therebetween in the vertical direction. Thus, for example, the mixed liquid can flow sequentially from the secondary vessel on the upper side to the secondary vessel on the lower side.

Figure 13B:
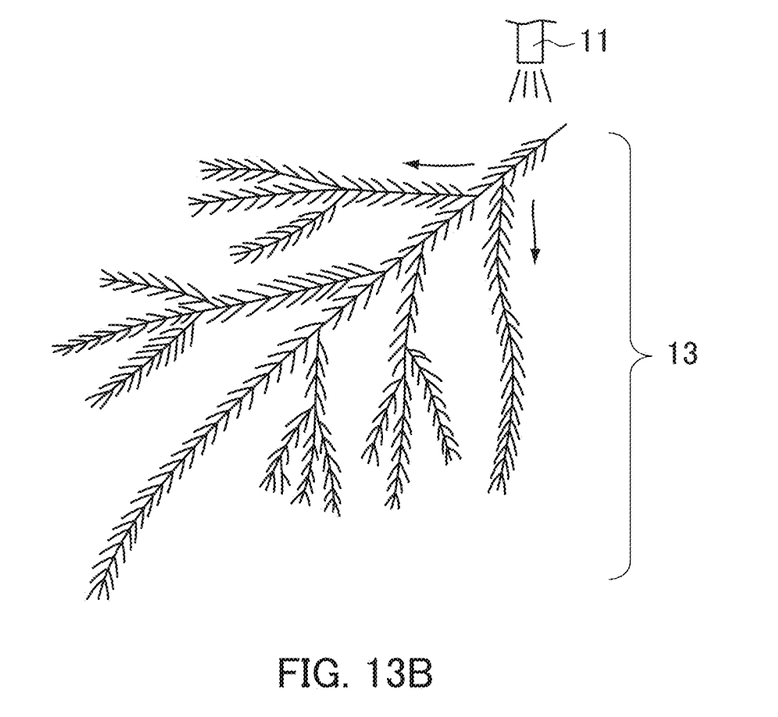

Further, for example, as described above, when the mixed liquid and the gas are brought into contact with each other in a state where the mixed liquid is allowed to stand or a flow is generated in the mixed liquid, the vessel 13 may have a network structure, for example. Then, for example, the mixed liquid may be allowed to come into contact with the gas by flowing through the network structure. Examples of the network structure include a mesh-like structure and a branched structure such as a structure of cedar leaves as shown in FIG. 13B. The size, fineness, and the like of the network structure can be appropriately set. The network structure can be formed, for example, as an aggregate of a plurality of plate-like, granular, or rod-like structures. The material for forming the network structure is not particularly limited, and may be, for example, plastic.

EXAMPLES

Hereinafter, the present invention will be described with reference to examples. It is to be noted, however, that the present invention is not restricted by the following examples. Commercially available reagents were used based on their protocols unless otherwise mentioned.

Example 1

It was examined that carbon dioxide can be fixed by bringing a mixed liquid containing sodium hydroxide (NaOH) and calcium chloride ($CaCl_2$) into contact with a gas containing carbon dioxide ($CO_2$) by bubbling the gas into the mixed liquid in the vessel.

A 1 N sodium hydroxide solution (manufactured by Wako Pure Chemical Industries, Ltd.) was diluted with distilled water so as to have concentrations of 0.01, 0.02, 0.1, 0.2, and 0.4 N to prepare sodium hydroxide solutions having the respective concentrations. Further, a 1 mol/l calcium chloride solution (manufactured by Wako Pure Chemical Industries, Ltd.) was diluted with distilled water so as to have concentrations of 0.01, 0.02, 0.1, 0.2, and 1 (undiluted) mol/l to prepare calcium chloride solutions having the respective concentrations.

3 ml of each of the sodium hydroxide solutions of the respective concentrations and 3 ml of the 0.1 mol/l calcium chloride solution were added to a 10 ml-test tube and mixed. Then, by bubbling carbon dioxide ($CO_2$ 100%, manufactured by KOIKE SANSO KOGYO CO., LTD.), the carbon dioxide was brought into contact with the mixed liquid. The bubbling was performed by ejecting carbon dioxide from the tip of a Pasteur pipette. The bubbling condition was 10 seconds (about 20 $cm^3$). After the contact, the mixed liquid was centrifuged at 3000 rpm for 10 minutes. Then, before and after the contact, the weight of the test tube was measured, and the difference in the weight between before and after the contact was calculated as the precipitation amount. It is to be noted that, as will be described below, when the precipitate is produced before contact with the carbon dioxide, the contact was carried out after removing the precipitate.

Figure 1:
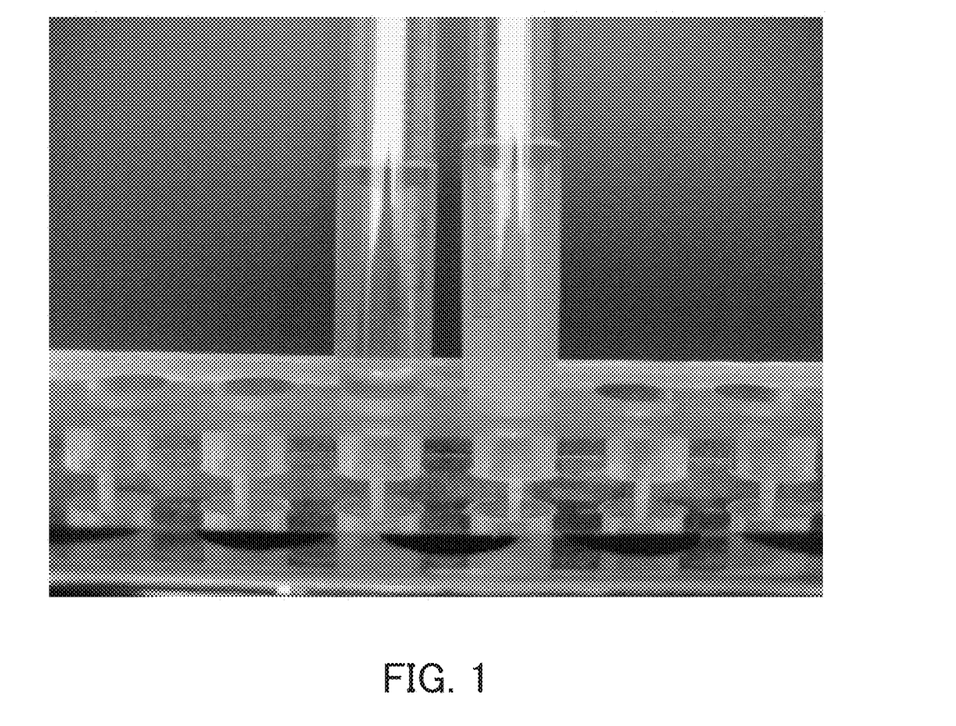
FIG. 1 is a photograph of mixed liquids containing sodium hydroxide and calcium chloride before and after contact with carbon dioxide in Example 1.
Figure 2:
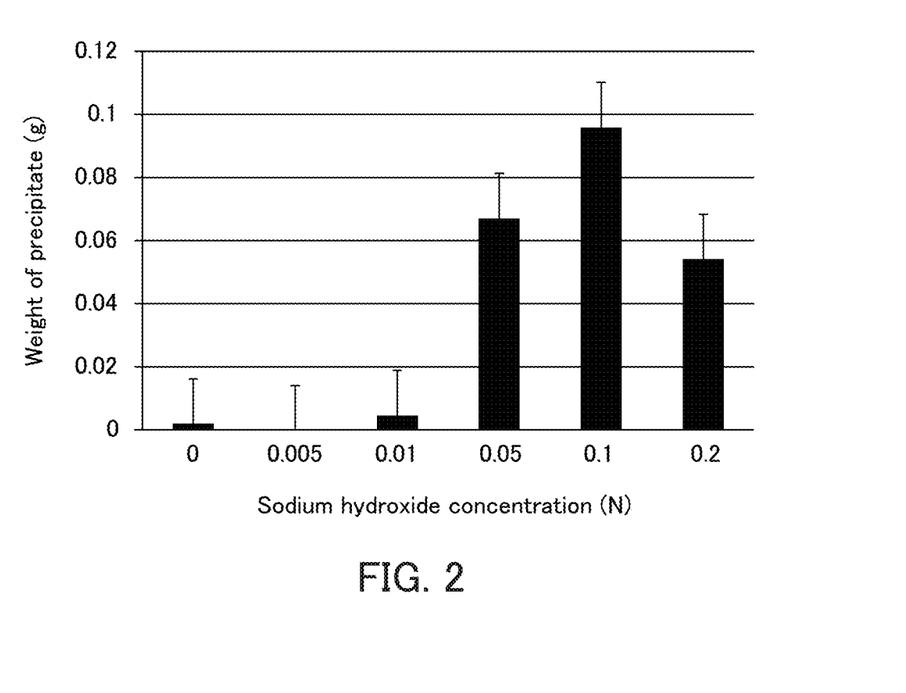
FIG. 2 is a graph showing the weight of the precipitate produced in the mixed liquid due to contact with carbon dioxide in Example 1.

The results are shown in FIGS. 1 and 2. FIG. 1 is a photograph of mixed liquids containing 0.05 N sodium hydroxide and 0.05 mol/l calcium chloride before and after the contact with the carbon dioxide. In FIG. 1, the left test tube contains the mixed liquid before the contact and the right test tube contains the mixed liquid after the contact. As shown in FIG. 1, by bringing the mixed liquid into contact with the carbon dioxide, a white precipitate of calcium carbonate ($CaCO_3$) was produced in the mixed liquid. It is to be noted that, in the mixed liquid, a white turbidity was observed before the completion of bubbling for 10 seconds.

FIG. 2 is a graph showing the weight of the precipitate produced in the mixed liquid due to contact with the carbon dioxide. In FIG. 2, the vertical axis indicates the weight (g) of the precipitate per test tube, and the horizontal axis indicates the sodium hydroxide concentration (N) in the mixed liquid. It is to be noted that each value of the weight of the precipitate was an average value of measured values of a total of 5 samples of the mixed liquid. As shown in FIG. 2, as a result of bringing the mixed liquid into contact with the carbon dioxide, the precipitate was produced in the mixed liquid having the sodium hydroxide concentration of 0.01 N or more. The amount of the precipitate was greatly increased at the concentration of 0.05 N, and the amount of the precipitate was maximum at the concentration of 0.1 N. On the other hand, the amount of the precipitate was decreased at the concentration of 0.2 N as compared to the value at the concentration of 0.1 N. It was verified that more carbon dioxide could be fixed at the concentrations of 0.05 N to 0.2 N, and at the concentrations 0.05 N to 0.1 N.

It is to be noted that, when the sodium hydroxide concentration was 0.2 N, a white precipitate was formed in the mixed liquid before the contact with carbon dioxide. This white precipitate is considered to be calcium hydroxide ($Ca(OH)_2$) produced by the reaction between calcium chloride and high concentration sodium hydroxide. Therefore, as a reason why the precipitation amount was decreased at the concentration of 0.2 N, it is considered that calcium hydroxide was produced by the reaction between calcium chloride and high concentration sodium hydroxide, so that the synthesis amount of calcium carbonate due to the contact was decreased.

Next, the contact was carried out in the same manner as described above except that 3 ml of the 0.1 N sodium hydroxide solution and 3 ml of each of the calcium chloride solutions having respective concentrations were added and mixed to prepare the mixed liquid.

Figure 3:
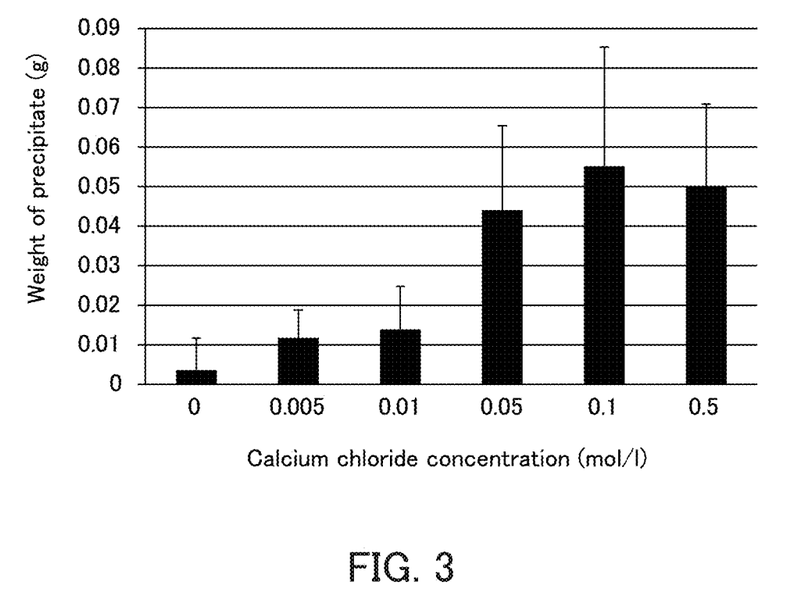
FIG. 3 is a graph showing the weight of the precipitate produced in the mixed liquid due to contact with carbon dioxide in Example 1.

The results are shown in FIG. 3. FIG. 3 is a graph showing the weight of the precipitate produced in the mixed liquid due to contact with the carbon dioxide. In FIG. 3, the vertical axis indicates the weight (g) of the precipitate per test tube, and the horizontal axis indicates the calcium chloride concentration (mol/l) in the mixed liquid. It is to be noted that each value of the weight of the precipitate was an average value of measured values of a total of 5 samples of the mixed liquid. As shown in FIG. 3, the precipitate was produced at all calcium chloride concentrations as a result of bringing the mixed liquid into contact with carbon dioxide. The amount of the precipitate was greatly increased at the concentration of 0.05 mol/l, and the amount of the precipitate was maximum at the concentration of 0.1 mol/l. It was verified that more carbon dioxide could be fixed when the calcium chloride concentration was 0.05 mol/l to 0.5 mol/l.

It is to be noted that, when the calcium chloride concentration was 0.2 mol/l to 0.5 mol/l, formation of a white precipitate was observed in the mixed liquid before the contact with carbon dioxide. Then, this white precipitate was disappeared by adding carbon dioxide during the contact. On the other hand, when the calcium chloride concentration was 0.1 mol/l and 0.05 mol/l, a precipitate was formed in the mixed liquid, and even if the contact was carried out, the precipitate was not disappeared.

As described above, it was verified that carbon dioxide can be fixed by bringing a mixed liquid containing sodium hydroxide and calcium chloride into contact with a gas containing carbon dioxide by bubbling the gas into the mixed liquid in the vessel.

Example 2

It was examined that carbon dioxide can be fixed by bringing a mixed liquid containing sodium hydroxide and calcium chloride into contact with a gas containing carbon dioxide in a state where the mixed liquid is allowed to stand or shaken in a vessel.

An equal amount of the 0.1 N sodium hydroxide solution and the 0.1 mol/l calcium chloride solution were mixed to prepare a mixed liquid. A 2 l-PET bottle (commercially available one) having a common shape was brought into equilibrium with air, and then 10 ml of the mixed liquid was added to the PET bottle. The PET bottle was allowed to stand with its bottom facing down, and the mixed liquid was brought into contact with carbon dioxide. The carbon dioxide concentration in the PET bottle was measured using a carbon dioxide monitor (manufactured by RI-85, manufactured by RIKEN KEIKI Co., Ltd.) at 0 minutes after (immediately after the contact), 15 minutes after, 30 minutes after, 60 minutes after, and overnight after the contact.

Figure 4:
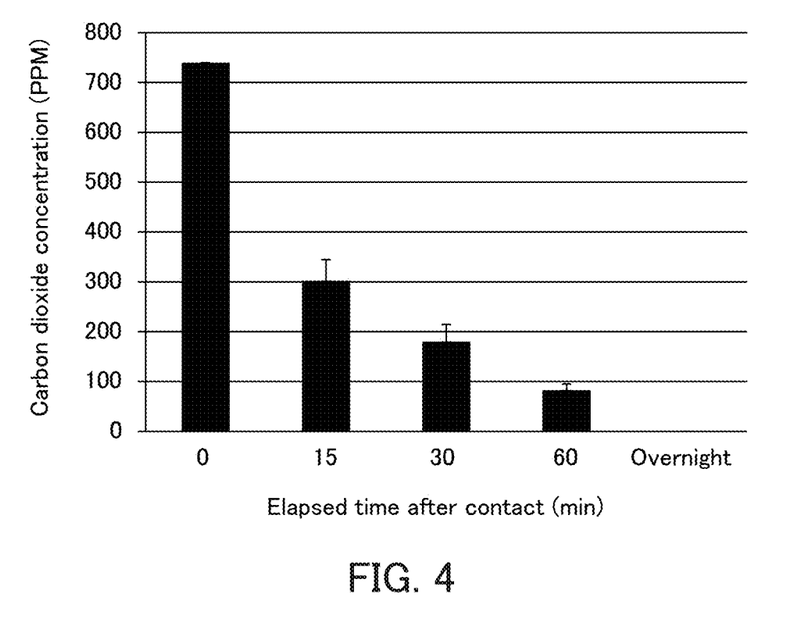
FIG. 4 is a graph showing the carbon dioxide concentration in the vessel after contact in Example 2.

The results are shown in FIG. 4. FIG. 4 is a graph showing the carbon dioxide concentration in the PET bottle after the contact. In FIG. 4, the vertical axis indicates the carbon dioxide concentration (PPM) and the horizontal axis indicates the elapsed time after the contact (minutes). It is to be noted that each value of the carbon dioxide concentration was an average value of measured values of a total of 4 samples at 0 minutes after (immediately after the contact), 15 minutes after, 30 minutes after, and 60 minutes after the contact. It is to be noted that, the measured values of a total of 6 samples after overnight contacting were all 0 PPM. As shown in FIG. 4, due to the contact, the carbon dioxide concentration in the PET bottle was decreased according to the elapsed time after the contact. Further, since the value of the carbon dioxide concentration became 0 PPM after overnight contacting, it was found that even a low concentration carbon dioxide can be fixed according to the present invention.

Next, the contact was carried out for 5 minutes in the same manner as described above except that an octagonal prism plastic bottle of the shape shown in FIG. 5 was used instead of the PET bottle, and the octagonal prism plastic bottle was allowed to stand in a state of being overturned with its side facing down or the octagonal prism plastic bottle was shaken in a state of being overturned with its side facing down. FIG. 5A is a view of the octagonal prism plastic bottle as viewed from the lateral direction and FIG. 5B is a view of the octagonal prism plastic bottle as viewed from the bottom. The shaking was performed using a shaker (BR-21UM, manufactured by TAITEK Corporation) at 120 rpm.

Figure 6:
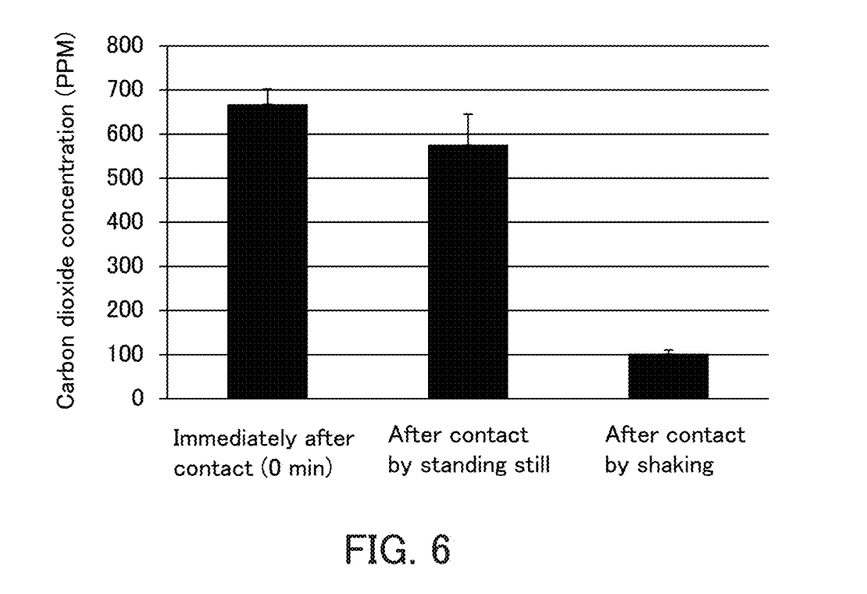
FIG. 6 is a graph showing the carbon dioxide concentration in the vessel after contact in Example 2.

The results are shown in FIG. 6. FIG. 6 is a graph showing the carbon dioxide concentration in the octagonal prism plastic bottle after the contact. In FIG. 6, the vertical axis indicates the carbon dioxide concentration (PPM), and the horizontal axis indicates, from the left, immediately after the contact (0 min), after contact by the standing, and after contact by the shaking. It is to be noted that each value of the carbon dioxide concentration was an average value of measurement values of a total of 4 samples. As shown in FIG. 6, the carbon dioxide concentration in the octagonal prism plastic bottle was decreased due to the contact by the shaking as compared to that immediately after the contact. Specifically, the carbon dioxide concentration in the octagonal prism plastic bottle was greatly decreased to about ⅙ due to the contact by the shaking as compared to that immediately after the contact, which showed that more carbon dioxide can be fixed due to the contact by the shaking.

As described above, the carbon dioxide concentration was greatly decreased due to the contact by the shaking as compared to that by the contact in a state of standing still. It is considered that the reason for this is that, due to the shaking, the surface area of the mixed liquid increases, so that the mixed liquid can be brought into contact with more gas containing the carbon dioxide. Further, it is considered that, since the octagonal prism plastic bottle has more planar bottom and short dimension as compared to a PET bottle of a common shape, the surface area of the mixed liquid is further increased.

Next, the contact was carried out under a different shaking condition. Instead of the octagonal prism plastic bottle, the 2 l-PET bottle having a common shape was used. Twelve hours before the contact, the cap of the PET bottle was opened, a tip of the Pasteur pipet was inserted into the mouth of the PET bottle, and carbon dioxide was fed from the tip.

Then, 50 ml of the mixed liquid was fed into the PET bottle, and then vigorously shaken by an adult male hand 1 to 6 times with a shaking of 30 seconds as a single shake. The first contact by the shaking was performed immediately after the contact, and the second to sixth contacts by the shaking were performed 2 minutes after, 5 minutes after, 15 minutes after, 30 minutes after, and 60 minutes after the completion of the contact, respectively. Then, after the first to sixth contacts, the carbon dioxide concentration was measured using a carbon dioxide detector (XP-3140, manufactured by COSMO).

Further, after the sixth contact, 50 ml of the mixed liquid was further added and shaken vigorously for 30 seconds, and then the carbon dioxide concentration was measured. Thereafter, the carbon dioxide concentration was further measured after being stand still for 24 hours. Further, after being stand still for 24 hours, 50 ml of the mixed liquid was further added, the mixed liquid was shaken vigorously for 30 seconds, and then the carbon dioxide concentration was measured.

Figure 7:
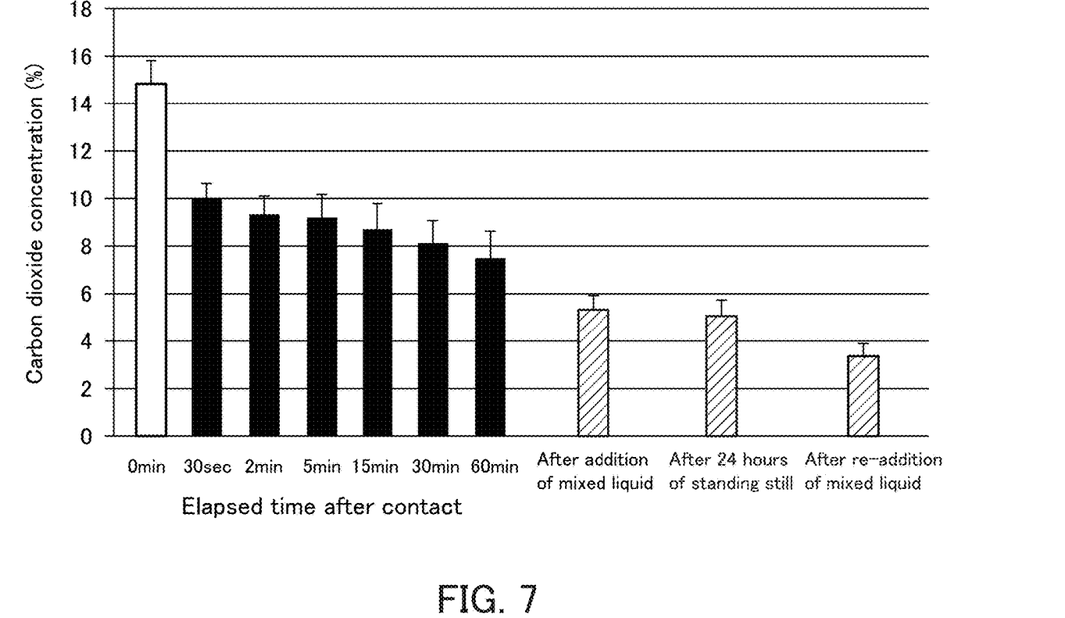
FIG. 7 is a graph showing the carbon dioxide concentration in the vessel after contact in Example 2.

The results are shown in FIG. 7. FIG. 7 is a graph showing the carbon dioxide concentration in the PET bottle after the contact. In FIG. 7, the vertical axis indicates the carbon dioxide concentration (%), the horizontal axis indicates, from the left, immediately after the contact (0 minutes), after the contact by the first shaking (30 seconds), after the contact by the second shaking (2 minutes), after the contact by the third shaking (5 minutes), after the contact by the fourth shaking (15 minutes), after the contact by the fifth shaking (30 minutes), after the contact by the sixth shaking (60 minutes), after addition of the mixed liquid, after 24 hours of standing still, and after re-addition of the mixed liquid. It is to be noted that each value of the carbon dioxide concentration was an average value of measured values of a total of 5 samples. As shown in FIG. 7, the carbon dioxide concentration was greatly decreased after the first contact (30 seconds) as compared to that immediately after the contact (0 minutes). The carbon dioxide concentration was decreased slowly after the second to sixth contacts. On the other hand, the addition of the mixed liquid caused a sharp further decrease in carbon dioxide concentration. A remarkable decrease in the carbon dioxide concentration was also observed in the re-addition of the mixed liquid. Thus, it was verified that, the carbon dioxide concentration was decreased even in a state of a high carbon dioxide concentration, by adding the mixed liquid again.

As described above, it was verified that carbon dioxide can be fixed by bringing a mixed liquid containing sodium hydroxide and calcium chloride into contact with a gas containing carbon dioxide in a state where the mixed liquid is allowed to stand or shaken in a vessel.

Example 3

It was examined that carbon dioxide can be fixed by bringing a mixed liquid containing sodium hydroxide and calcium chloride into contact with a gas containing carbon dioxide in a state where the mixed liquid is in a state of mist in a vessel.

Figure 8:
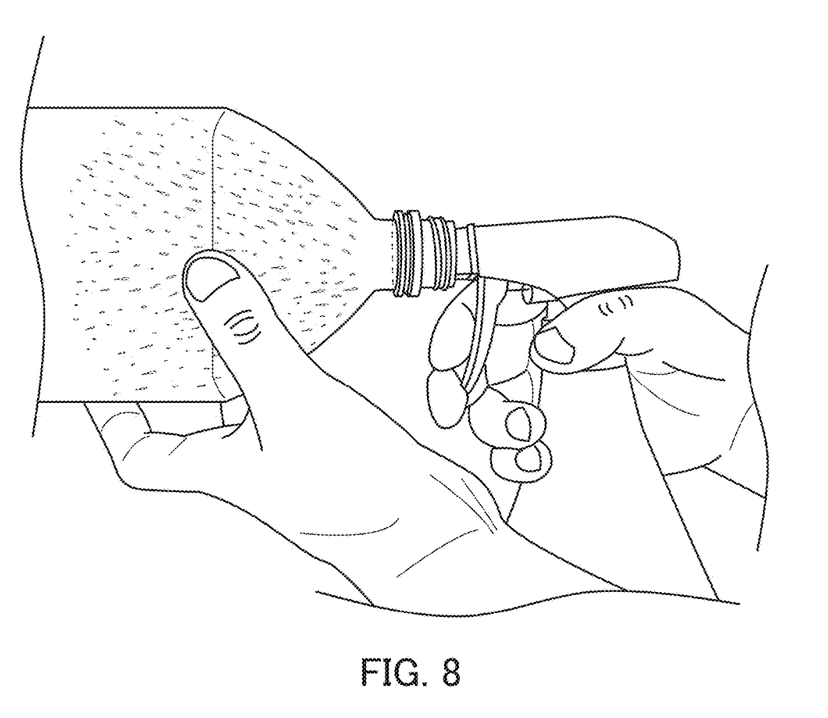
FIG. 8 is a diagram showing a state where contact is carried out by spraying in Example 3.

A mixed liquid containing the sodium hydroxide and the calcium chloride was prepared in the same manner as in Example 2. A 2 l-PET bottle having a common shape was used, and the inside of the PET bottle was brought into equilibrium with air in the same manner as in Example 2. Thereafter, about 4 ml of the mixed liquid was sprayed into the PET bottle 10 times at intervals of 5 seconds using a sprayer (commercially available one), whereby the mixed liquid was brought into contact with carbon dioxide. The contact was carried out using the PET bottle in a state of being overturned with its side facing down as shown in FIG. 8, and the spraying was carried out in the horizontal direction. Immediately after the contact, the carbon dioxide concentration in the PET bottle was measured in the same manner as in Example 2.

Figure 9:
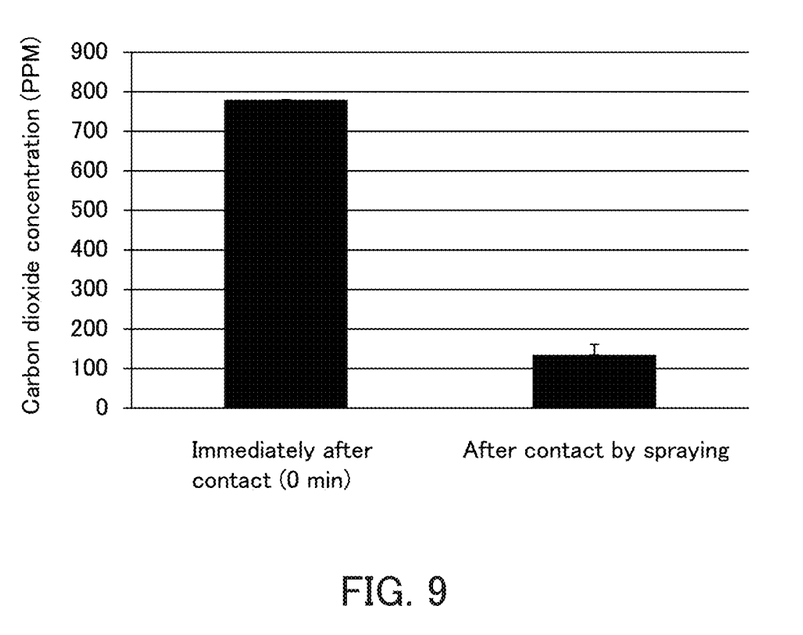
FIG. 9 is a graph showing the carbon dioxide concentration in the vessel after contact in Example 3.

The results are shown in FIG. 9. FIG. 9 is a graph showing the carbon dioxide concentration in the PET bottle after the contact. In FIG. 9, the vertical axis indicates the carbon dioxide concentration (PPM), and the horizontal axis indicates, from the left, immediately after the contact (0 min) and after the contact by spraying. It is to be noted that each value of the carbon dioxide concentration was an average value of measurement values of a total of 4 samples. As shown in FIG. 9, the carbon dioxide concentration in the PET bottle was greatly decreased to about ⅙ due to the contact by the spraying as compared to that immediately after the contact.

Thus, the carbon dioxide concentration was greatly decreased in a short time due to the contact by the spraying. It is considered that the reason for this is that the surface area of the mixed liquid increases greatly by bringing the mixed liquid in a state of mist into contact with the carbon dioxide, so that the mixed liquid can be brought into contact with more gas containing the carbon dioxide.

Figure 10:
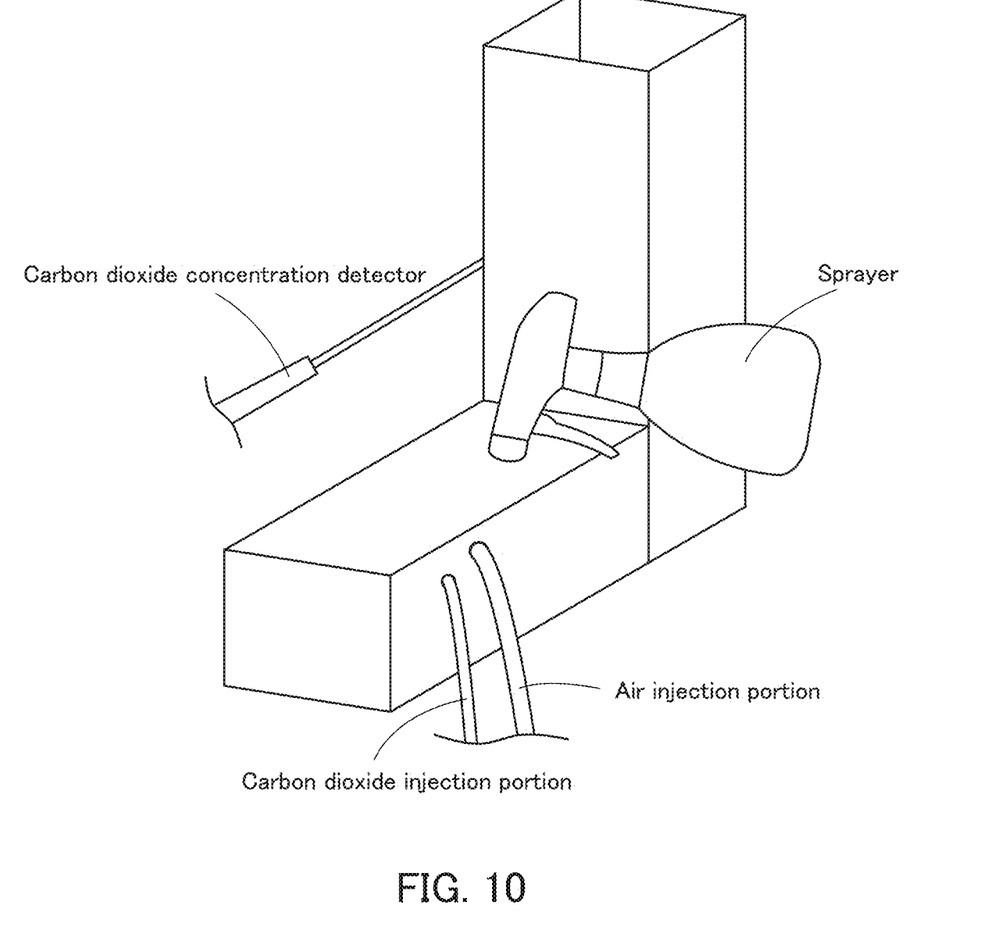
FIG. 10 is a diagram showing a contact unit in Example 3.

Next, the contact was carried out under a different spraying condition. The contact unit for carrying the contact was prepared as follows. As shown in FIG. 10, two boxes, which are milk packs, (commercially available ones) were connected in an L-shape, holes were formed at two places on the side surface of the lower box by partially cutting it, and silicon tubes were inserted through the holes, thereby providing an air injection portion and a carbon dioxide injection portion. In addition, a hole was formed on the upper surface of the lower box in the same manner so that the mixed liquid can be sprayed from the sprayer into the inside of the box. A large opening was formed at the connection site of the upper and lower boxes to allow carbon dioxide to rise from the lower box to the upper box. The connection site was provided with a gauze layer with 4 fold gauzes (commercially available one). The upper surface of the upper box was opened. In addition, a hole was formed on the side surface of the upper box in the same manner, and a nozzle of a carbon dioxide concentration detector (XP-3140, manufactured by COSMO) was installed.

The injection was carried out with the flow rate of air from the air injection portion being about 100 $cm^3$/sec and the flow rate of carbon dioxide from the carbon dioxide injection portion being 10 $cm^3$/sec until the measured carbon dioxide concentration becomes constant. Thereafter, the mixed liquid was sprayed 10 consecutive times from the sprayer. The spray amount of the mixed liquid was about 4 ml in total at 10 times. The measured value of the carbon dioxide concentration became the lowest value at about 20 seconds after the spraying.

Figure 11:
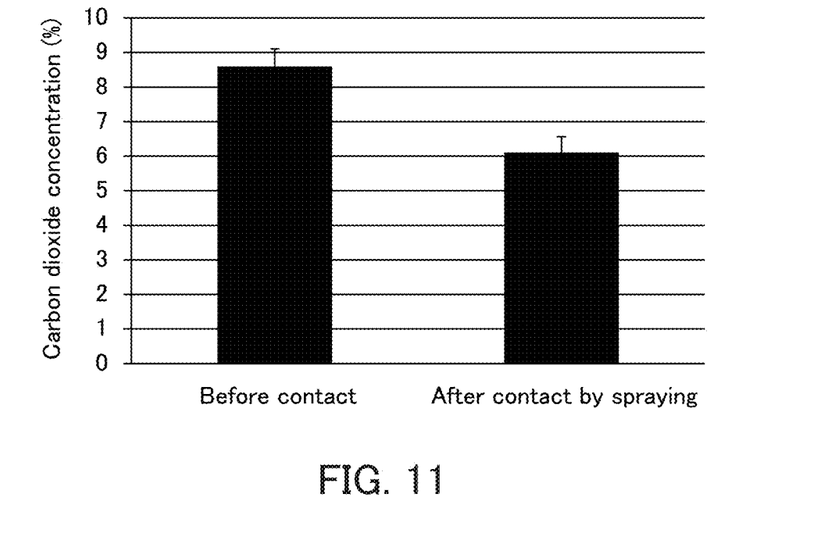
FIG. 11 is a graph showing the carbon dioxide concentration in the vessel after contact in Example 3.

The results are shown in FIG. 11. FIG. 11 is a graph showing the carbon dioxide concentration in the box when the measured value of carbon dioxide becomes the lowest value at about 20 seconds after the contact. In FIG. 11, the vertical axis indicates the carbon dioxide concentration (%) and the horizontal axis indicates, from the left, before the contact and after the contact by the spraying. It is to be noted that each value of the carbon dioxide concentration was an average value of measurement values of a total of 10 samples. As shown in FIG. 11, the carbon dioxide concentration in the box was decreased due to contact by the spraying as compared to that right after the contact.

As described above, it was verified that carbon dioxide can be absorbed by the mixed liquid even when the contact unit is an open system. Further, since the amount of the mixed liquid sprayed was as small as about 4 ml, it was found that a high carbon dioxide concentration can be sufficiently lowered even if the amount of the mixed liquid is small. This showed that the reaction system of the present invention has extremely excellent reaction efficiency.

As described above, it was verified that carbon dioxide can be fixed by bringing a mixed liquid containing sodium hydroxide and calcium chloride into contact with a gas containing carbon dioxide in a state where the mixed liquid is in a state of mist in a vessel.

While the present invention has been described above with reference to illustrative embodiments, the present invention is by no means limited thereto. Various changes and variations that may become apparent to those skilled in the art may be made in the configuration and specifics of the present invention without departing from the scope of the present invention.

INDUSTRIAL APPLICABILITY

As described above, the present invention can provide a new method for fixing carbon dioxide. Therefore, the present invention can be extremely useful in the disposal of combustion exhaust gas containing carbon dioxide and the like.

The invention claimed is:

1. A method for fixing carbon dioxide, comprising:
   a contact step of bringing a mixed liquid containing sodium hydroxide and further containing at least one of a chloride of a Group 2 element or a chloride of a divalent metal element into contact with a gas containing carbon dioxide.

2. The method for fixing carbon dioxide according to claim 1, comprising:
   a contact step of bringing a mixed liquid containing sodium hydroxide and calcium chloride into contact with a gas containing carbon dioxide.

3. The method for fixing carbon dioxide according to claim 1, wherein
   a concentration of the sodium hydroxide in the mixed liquid is less than 0.2 N.

4. The method for fixing carbon dioxide according to claim 1, wherein
   the concentration of the sodium hydroxide in the mixed liquid is 0.05 N or more.

5. The method for fixing carbon dioxide according to claim 1, wherein
   a concentration of the calcium chloride in the mixed liquid is 0.05 mol/l or more.

6. The method for fixing carbon dioxide according to claim 1, wherein
   in the contact step, the mixed liquid and the gas are brought into contact with each other by bubbling the gas into the mixed liquid.

7. The method for fixing carbon dioxide according to claim 1, wherein
   in the contact step, the mixed liquid and the gas are brought into contact with each other in a state where the mixed liquid is shaken.

8. The method for fixing carbon dioxide according to claim 1, wherein in the contact step, the mixed liquid and the gas are brought into contact with each other in a state where the mixed liquid is in a state of mist.

9. The method for fixing carbon dioxide according to claim 1, wherein
the contact step comprises:
a first contact step of bringing a mixed liquid containing sodium hydroxide into contact with a gas containing carbon dioxide; and
a second contact step of adding calcium chloride to the mixed liquid and further bringing the mixed liquid into contact with a gas containing carbon dioxide.

10. A method for producing fixed carbon dioxide, comprising:
a fixation step of fixing carbon dioxide, wherein
the fixation step is carried out by the method for fixing carbon dioxide according to claim 1.

11. A fixed carbon dioxide production apparatus, comprising:
a contact unit that brings a mixed liquid containing sodium hydroxide and further containing at least one of a chloride of a Group 2 element or a chloride of a divalent metal element into contact with a gas containing carbon dioxide.

12. The fixed carbon dioxide production apparatus according to claim 11, comprising:
a contact unit that brings a mixed liquid containing sodium hydroxide and calcium chloride into contact with a gas containing carbon dioxide.

13. The fixed carbon dioxide production apparatus according to claim 11, wherein
the contact unit is a unit that brings the mixed liquid and the gas into contact with each other by bubbling the gas into the mixed liquid.

14. The fixed carbon dioxide production apparatus according to claim 11, wherein
the contact unit is a unit that brings the mixed liquid and the gas into contact with each other in a state where a flow is generated in the mixed liquid.

15. The fixed carbon dioxide production apparatus according to claim 14, wherein
the contact unit is a unit that brings the mixed liquid and the gas into contact with each other in a state where the mixed liquid is shaken.

16. The fixed carbon dioxide production apparatus according to claim 14, wherein
the contact unit comprises a vessel in which the mixed liquid and the gas containing carbon dioxide are brought into contact with each other.

17. The fixed carbon dioxide production apparatus according to claim 16, wherein
the vessel comprises a plurality of secondary vessels, and
the mixed liquid is allowed to come into contact with the gas by sequentially flowing through the plurality of secondary vessels.

18. The fixed carbon dioxide production apparatus according to claim 16, wherein
the vessel has a polygonal cross-section at a bottom surface.

19. The fixed carbon dioxide production apparatus according to claim 16, wherein
the vessel has a network structure, and
the mixed liquid is allowed to come into contact with the gas by flowing through the network structure.

20. The fixed carbon dioxide production apparatus according to claim 14, wherein the contact unit is a unit that brings the mixed liquid and the gas into contact with each other in a state where the mixed liquid is in a state of mist.

* * * * *